Dec. 29, 1964 R. W. DOWNIN 3,163,394
BALL VALVE
Filed July 10, 1959 2 Sheets-Sheet 2
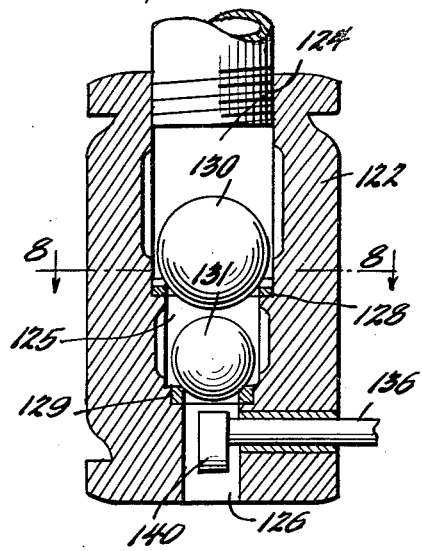
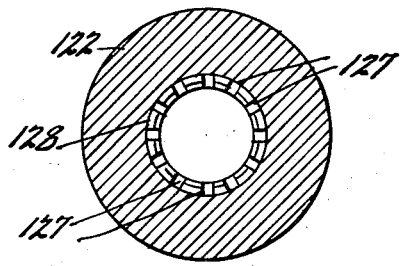
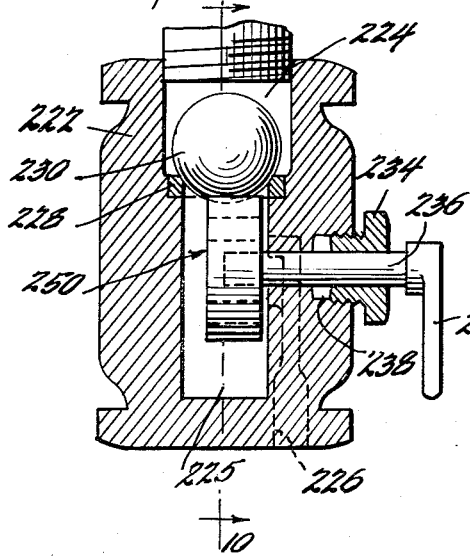
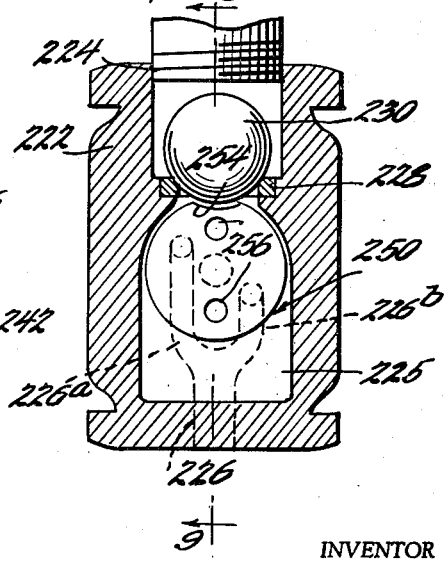
INVENTOR
Roland W. Downin,
BY Parker and Walsh
ATTORNEYS

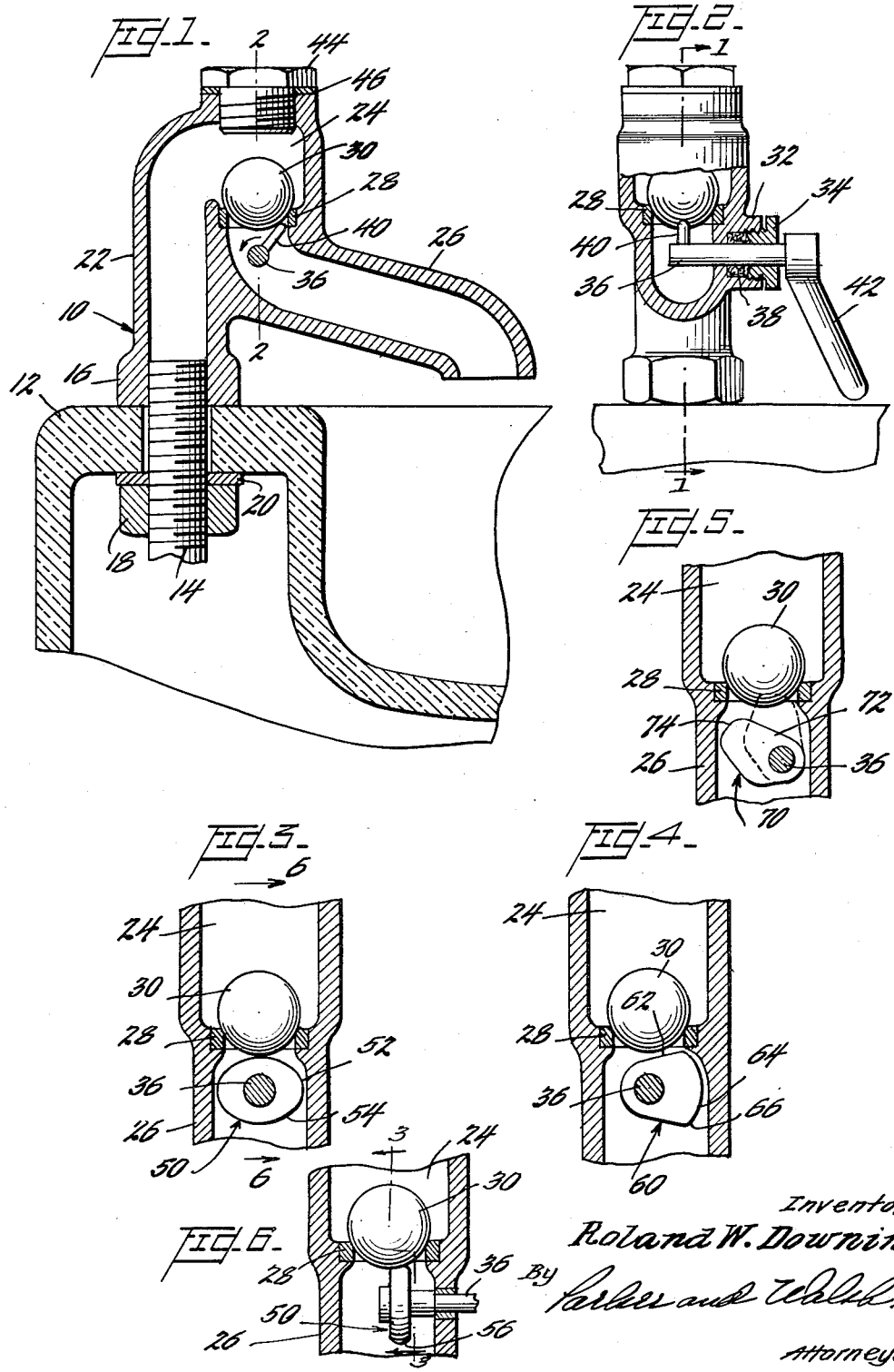

United States Patent Office 3,163,394
Patented Dec. 29, 1964

3,163,394
BALL VALVE
Roland W. Downin, 29 N. Main St., Port Deposit, Md.
Filed July 10, 1959, Ser. No. 826,192
4 Claims. (Cl. 251—120)

This invention relates to a valve or faucet in which the sealing element is a ball.

Ball valves are well enough known as a class although they are not as widely used as many other types. Such valves possess a number of attractive advantages: they tend to be self-closing and self-seating, thereby reducing loss of the confined fluid either from leakage or carelessness in leaving the valve open; they can be built with very few moving parts and usually without any packing under pressure, both factors tending toward economy of maintenance; a small amount of movement is all that is needed to open the valve for full flow and cutoff is positive.

This last factor, constitutes one of the major disadvantages of ball valves. The rapidity of opening and closing of the valve tends to set up pressure surges in the distribution system which, besides causing knocking and rattling of the pipes, can actually cause substantial physical damage to the piping system. My invention is aimed to overcome the abruptness of opening and closing these valves by means of structure that tends to delay the initial portion of opening and the final portion of the closing operation. Such delaying action may be applied at the actual point of ball movement or it may take place slightly upstream or downstream of the ball location. The invention is susceptible of many different embodiments. A number of these are illustrated in the drawings forming a part of this application wherein:

FIGURE 1 is a vertical section along the line 1—1 of FIGURE 2 of a faucet embodying my invention, showing the manner of its installation on a sink;

FIGURE 2 is an elevation, partly in section, along the line 2—2 of FIGURE 1;

FIGURE 3 is a partial view in vertical section, along the line 3—3 of FIGURE 6, of a modified form of my invention;

FIGURE 4 is a partial view in vertical section, similar to FIGURE 3, of another form of the invention;

FIGURE 5 is another partial view in vertical section similar to FIGURE 3 of still another form of the invention;

FIGURE 6 is a partial view in vertical section along the line 6—6 of FIGURE 3;

FIGURE 7 is a vertical sectional view of a valve showing a modified form of my invention;

FIGURE 8 is a plan view of the valve seat of FIGURE 7;

FIGURE 9 is a vertical section on line 9—9 of FIGURE 10 of another valve; and

FIGURE 10 is a vertical section on line 10—10 of FIGURE 9.

Referring first to FIGURES 1 and 2 of the drawings, a faucet body 10 is shown mounted on a sink bowl 12. The threaded end of the water supply pipe 14 is passed through an opening in the sink body 12 to be connected to the internally threaded base 16 of the faucet body. The connection is drawn tight by means of nut 18 and gasket 20 on the underside of the sink surface. The column 22 terminating in chamber 24 supports the spout 26 and elevates it above the bowl portion of the sink.

A circular ring seat 28 is located between the chamber 24 and the channel of the spout 26. If desired, in order to provide for replacement of a worn or pitted seat, the seat ring 28 may be made removable as shown. The bodies of these fittings are ordinarily made of cast brass, in accordance with customary practice. I have found that seats made of molded nylon possess significant advantages. They snap readily into place and have high resistance to both chemical and mechanical erosion. Additionally, they tend to suppress some of the noise encountered in the operation of the valve.

The ball 30 resting naturally by gravity upon the seat 28, is kept firmly seated thereon by the water pressure in supply pipe 14. Many different materials may be used in the formation of ball 30. I prefer a relatively tough, firm rubbery composition such as is extensively used in the manufacture of faucet washers. If it is desired to increase the specific gravity of the ball, such composition may be molded around a central metallic core.

A threaded boss 32 upon one side of the spout is provided with a cooperating packing nut for mounting operating shaft 36. The packing 38 housed within the boss 32 need not afford the degree of sealing normally required in conventional faucets, since, when the valve is closed, there is no hydraulic pressure exerted on the packing and, when the valve is open, the pressure in the spout 26 is negligible.

Upon the inner end of the shaft 36, is the lifting pin 40 having a rounded outer end. To operate the shaft 36, a suitable handle 42 is attached to the outer end. Access to the upper portion of chamber 24 is had through the threaded cap 44 which seals the chamber with the aid of gasket 46.

It will be noted that the axis of shaft 36 intersects, at right angles, the vertical axis passing through the center of the ball 30. It is along this vertical axis that the hydraulic pressure within the water system acts to hold the ball 30 upon the seat 28. Since the pin 40 extends outwardly of the shaft 36, it will be apparent that the outer end of the pin, when actuated by the handle 42, does not raise the ball 30 directly off the seat along the vertical axis but instead, first displaces it to one side as well as somewhat upwardly. This method of displacement reduces the amount of force needed to unseat the ball and results in a more gradual enlargement of the opening through which the water may pass. At the same time, the manner in which the ball is displaced results in a partial rotation of the ball so that it must return to its seat in a different orientation from that previously occupied. Consequently, there is a more even degree of wear upon the ball, adding to its life.

Similarly, when the ball is permitted to return to its seat as the pin 40 is moved to non-operating position, the ball is prevented from abruptly striking the seat to cause a pressure surge in the line with the water flow cutoff. There may be sufficient frictional engagement of the shaft 36 and the packing 38 to cause the valve to remain in open condition when the handle 42 is operated. Frequently, it is desirable to reduce the amount of friction to the point where the hydraulic force of the water system will cause the ball 30 to act upon the pin 40 to close the valve when the handle 42 is released. The angular force exerted by the ball 30 against the outer end of the pin, besides slowing down the cutoff of the water, is more effective at bringing about a complete seal.

In FIGURE 3, the elliptical cam 50 replaces the pin 40 shown in FIGURES 1 and 2. It will be apparent that with the valve closed as shown in the figure, either of the two low sides 54 of the cam 50 permits the ball to rest upon seat 28 while a quarter turn of the operating handle, in either direction, will cause either of the high sides 52 of the cam to unseat the ball 30. In turn, the valve may again be closed either by continuing movement of the handle in the same direction or by reversing movement of the handle. This construction not only provides the convenience of permitting operation of the handle in either direction; it renders impossible any damage to the mechanism resulting from inadvertent improper rotation of the handle.

As shown in FIGURE 4, a single lobe cam 60 may be employed having a relatively flat inclined surface 62 and an elongated curved surface 64. The length and slope of the inclined surface 62 may be selected to govern the rate of opening of the valve while, if the length of the curved section of the cam 64 is made sufficiently great, the end 66 of the cam surface 64 will extend beyond the vertical axis through the center of the ball so that the valve will remain in full open position, if such arrangement is desirable.

As shown in FIGURE 5, it may be desirable to mount the shaft to one side of the vertical axis passing through the ball. The cam 70 may be designed with an inclined surface 72 and a high point 74 to give the desired type of flow characteristics.

As shown in FIGURE 6, it is desirable to mount the cam 50 (or the equivalent cams 60 or 70) slightly at one side of the axis passing vertically through ball 30, while providing a rounded face 56 upon the cam 50. In this way, there is no tendency for the ball 30 to rest suspended upon a flattened face of the cam.

Another modification is shown in FIGURE 7; the body 122 includes a first chamber 124 and an intermediate chamber 125 from which fluid passes to channel 126. Passage of liquid from the intermediate chamber 125 to the outlet channel 126 is controlled by lower ball 131 resting upon seat 129. Movement of the ball 131 is effected by the cam 140 carried by shaft 136 in the same manner as previously set out in the descriptions of FIGURES 1 and 2.

Passage of liquid from the main chamber 124 to the intermediate chamber 125 is controlled by ball 130 resting on seat 128 in a manner analogous to that of ball 131 but with certain important differences. The cross section of the main chamber 124 must be greater than that of the intermediate chamber 125 and the diameter of ball 130 must be greater than that of ball 131 in order to provide for proper assembly of the parts. The seat 128 for the ball 130 is deliberately provided with a series of notches 127 to permit a limited amount of leakage past the seat. The proportions of the parts are so selected that, when the flow of liquid is cut off, there is a small amount of clearance between the two balls 130 and 131.

When the shaft 136 is operated to cause displacement of ball 131 by the pin 140, a small trickle of water past the ball 130, through the notches 127, enters the intermediate chamber 125 and thence into the passage 126. The notches are so designed that only a small amount of the total flow, less than ten percent and preferably about three percent of the full flow is permitted to pass in this manner. As the ball 131 is raised further, it displaces ball 130, permitting a larger flow of water to take place until the full rated capacity of the valve is reached. The process is reversed in closing the valve with the major portion of the flow being first cut off followed by a gradual reduction to complete stoppage.

In the modification shown in FIGURES 9 and 10, the body 222 has an inlet chamber 224 and an outlet chamber 225, the passage of liquid between the two chambers being controlled by ball 230 resting on seat 228. A shaft 236 having handle 242 passes through packing nut 234 and packing 236 into the body 222.

Upon the inner end of shaft 236 is the cam 250, having the form of a disc with a cut-out sector, to provide a low point 254. The cam 250, shaft 236 and handle 242 all cooperate to displace the ball 230 in the manner disclosed above, in respect to the other modifications. Two passages 226a and 226b in the body 222 communicate with the outlet chamber at one end thereof and unite into a single outlet passage 226. With the ball 230 upon its seat, passage of liquid from the chamber 225 to the outlet 226 is largely blocked by the cam 250. The flat side face of the cam 250 is not intended to seal the face of the two passages 226a and 226b but it does materially diminish the flow of water into the passage 226 during the closed and partly open positions of the valve. As the cam 250 is moved to displace the ball 230, the ports 256 in the cam 250, move more closely into alignment with the openings of channels 226a and 226b until in the open position of the valve, there is free flow of water all the way from the inlet chamber to the outlet passage 226. The back pressure created by the disalignment between ports 256 and passages 226a and 226b, tends to throttle the discharge of water from the valve as the valve is being closed, thus permitting the ball 230 to drop more slowly into place than would be true if there were no obstruction leading to the discharge.

It will be obvious that the angular displacement of the ports 256 with relation to the passages 226a and 226b, may be chosen to regualte the manner in which the valve is opened and closed. Similarly, the ports 256 may be made arcuate to extend the degree of coincidence of the ports with the corresponding channels and further regulation may be brought about by making the ports narrower at the point corresponding to the first portion of opening and wider at the portion of travel where the valve is more nearly open.

It will be apparent that many additional modifications of my invention may be devised all related to each other by the gradual seating of the ball as the flow of liquid through the valve is cut off. In common with all ball valves, my valve is suited to operation in one direction only. Although several materials of construction have been indicated as preferred, it should be apparent that my invention is not limited in the manner indicated but is susceptible of use with many other materials. For the precise definition of the scope of my invention, reference should be had to the claims that follow.

I claim:

1. In a ball valve having a ball-retaining inlet chamber under the pressure of the liquid supply system when the valve is closed, a discharge chamber downstream of the inlet chamber, an annular seat having its principal plane substantially at right angles to the axis of fluid flow from the inlet chamber to the outlet chamber and forming the threshold between said chambers, a ball in said inlet chamber and adapted to rest upon said seat, the elements of said inlet chamber adjacent said seat being arranged to afford said ball substantially free movement in all directions within said chamber when said ball is unseated, a member in said discharge chamber for displacing said ball from its seat by contact therewith, said displacement member moving during the displacement action, with a tangential component with respect to the ball whereby the ball is caused to move off its seat with a sidewise as well as a retrogressive movement and an actuator for said displacing member and means for throttling the liquid flow, actuated by the ball displacing member, said means being principally operative during the initial opening and final closing of the valve.

2. The valve of claim 1 wherein a conduit is provided for conducting liquid away from the discharge chamber and said throttling means is interposed between the discharge chamber and the eduction conduit.

3. The valve of claim 2 wherein the throttling means is incorporated in the body of the cam.

4. The valve of claim 3 wherein a port extending through the body of the cam is aligned to connect the discharge chamber with the eduction conduit as a dwell of the cam is aligned to displace the ball and wherein said port is aligned to throttle the passage of liquid from the discharge chamber as the cam moves from ball-displacing dwell to valve-closing dwell.

References Cited in the file of this patent

UNITED STATES PATENTS

| | | |
|---|---|---|
| 796,392 | Bailey | Aug. 1, 1905 |
| 851,999 | Skellenger | Apr. 30, 1907 |
| 942,666 | Romstaedt | Dec. 7, 1909 |
| 1,374,308 | MacIssac | Apr. 12, 1921 |
| 1,800,314 | Noftzger | Apr. 14, 1931 |

FOREIGN PATENTS

| | | |
|---|---|---|
| 3,639 | Great Britain | of 1873 |
| 22,272 | Great Britain | of 1906 |
| 203,907 | Great Britain | of 1923 |
| 439,553 | Great Britain | of 1936 |